United States Patent [19]

Lawford

[11] 4,377,809
[45] Mar. 22, 1983

[54] LIQUID LEVEL SYSTEM

[75] Inventor: Victor N. Lawford, Pasadena, Calif.

[73] Assignee: ITT, New York, N.Y.

[21] Appl. No.: 257,741

[22] Filed: Apr. 27, 1981

[51] Int. Cl.³ .............................................. G08B 21/00
[52] U.S. Cl. .................................. 340/623; 200/83 L;
73/301
[58] Field of Search ............... 340/614, 605, 623, 624, 340/626; 137/557, 558; 73/301, 308, 313, 716, 729, 722, 728; 200/83 A, 83 L, 83 W

[56] References Cited

U.S. PATENT DOCUMENTS

| 3,849,770 | 11/1974 | Hayashida | 200/83 L |
| 3,853,006 | 12/1974 | Lawford | 73/301 |
| 4,084,072 | 4/1978 | Tsubota et al. | 73/716 |
| 4,107,494 | 8/1978 | Tuegel | 200/83 L |

Primary Examiner—Gerald L. Brigance
Attorney, Agent, or Firm—A. D. Stolzy; T. E. Kristofferson; T. L. Peterson

[57] ABSTRACT

A liquid level system employs a bellows which is in flow communication with a differential pressure unit by a column of reference liquid. A float in the bellows carries a switch which energizes an alarm when liquid in the column is lost.

1 Claim, 3 Drawing Figures

LIQUID LEVEL SYSTEM

BACKGROUND OF THE INVENTION

This invention relates generally to a liquid level system and, more particularly, to such a system employing a differential pressure unit (DPU) for detecting the level of a liquid in a tank.

The water level in boilers and pressurized tanks is often measured by a DPU such as disclosed in U.S. Pat. Nos. 2,632,474 and 2,664,749. The DPU is connected to upper and lower regions of the tank by external conduits. The conduit connected to the upper region of the tank contains a sensor which is often referred to in the art as being a "seal pot." the conduit extending from the sensor to the DPU is filled with a constant level of water providing a "reference column." This reference column is essentially at ambient temperature, and applies a constant hydrostatic pressure to one side of the DPU. Steam pressure in the tank is also applied through the reference column to said one side of the DPU. The other side of the DPU detects the hydrostatic pressure of the water and the steam pressure in the tank. Since the steam pressure in the tank is applied to both sides of the DPU, its effect becomes cancelled. Thus, as the water level changes, the DPU indicates the magnitude and direction of change in the level.

A shortcoming of the aforementioned system is the possible loss of water in the reference column conduit coupling the sensor to the DPU. This loss may occur because of leakage in the conduit or seals at the sensor or DPU, sudden depressurization of the tank causing "flashing," or incomplete filling of the conduit during start-up of the system. The loss of water will cause the DPU to produce faulty signals. The signals will indicate the water level in the tank is increasing, whereas the level may actually be dropping.

It is, therefore, one object of the present invention to provide an alarm device for indicating a loss of water in the liquid level measuring system.

Reference is made to the liquid level systems disclosed in my U.S. Pat. No. 3,853,006 and my copending U.S. patent application Ser. No. 176,466, filed Aug. 8, 1980, entitled "Temperature Compensation Apparatus for a Liquid Filled Conduit " which embody a feature common to one of the features of the present invention, namely, the use of a bellows in a seal pot.

The bellows in my previous systems forms the upper end of the reference column conduit. If water is lost from the conduit, the resulting high differential pressure across the bellows may cause the bellows to collapse and rupture. This may result in liquid in the tank or seal pot, which may be toxic or otherwise dangerous, leaking out from the conduit.

It is another object of the present invention to provide means for closing off the reference column in the event the bellows ruptures.

SUMMARY OF THE INVENTION

According to a principal aspect of the present invention, there is provided an indicating or alarm device for a liquid level system of the type described hereinabove in which a pressure sensitive movable barrier, such as a bellows, is employed in the housing of the sensor separating the housing into separate chambers. The chamber which is in communication with the DPU, which forms a part of the reference column, contains a float that will drop when liquid in the column is lost. The float carries actuating means which actuates a switch when the float drops so as to energize an indicating or alarm device. Energization of the alarm will alert the plant personnel that the system should be examined so that corrective measures may be taken. Also, the float serves to close off the reference column conduit thereby preventing leakage of tank liquid therefrom if the bellows ruptures.

DESCRIPTION OF THE PREFERRED EMBODIMENT

Figure 1:
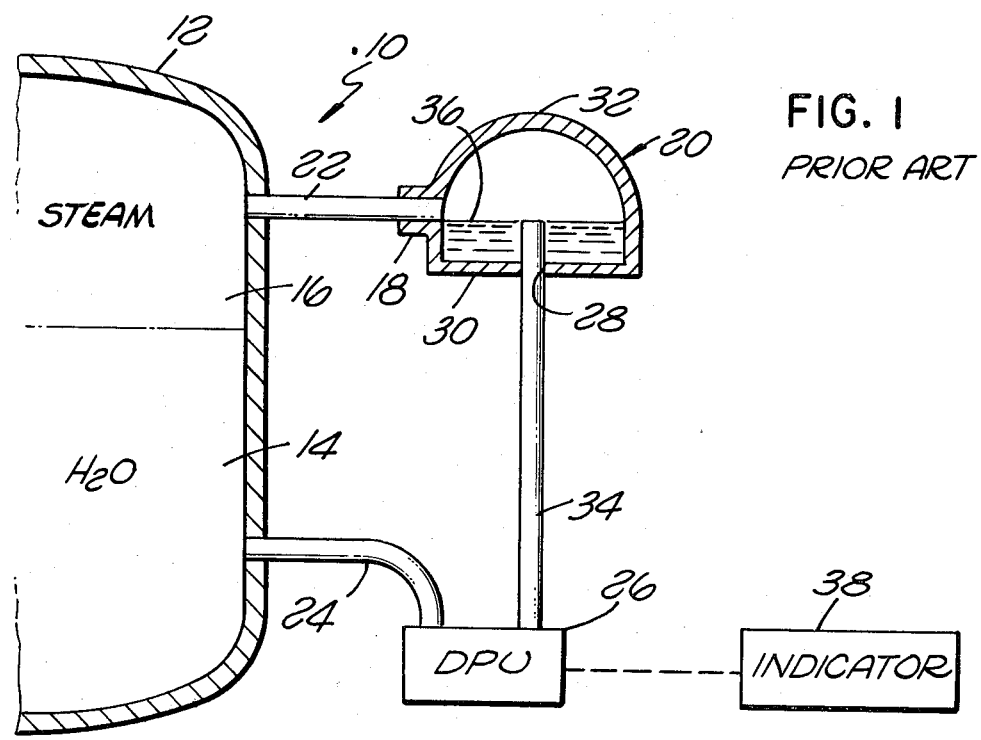
FIG. 1 is a diagrammatic view of a prior art liquid level system.

Reference is now made to FIG. 1 of the drawings which shows a prior art liquid level system 10 of the type described hereinabove. The system comprises a tank 12 which holds water 14 in its lower region and steam 16 in its upper region. The inlet port 18 of a seal pot or sensor 20 is coupled to the upper region of the tank by a conduit 22. The lower region of the tank is connected by a conduit 24 to one side of a DPU 26. A central bore 28 is formed in the base 30 of the sensor housing 32. A vertical conduit 34 coupled to the other side of the DPU extends upwardly into the sensor housing through the bore 28 to a height level with the conduit 22. Water 36 fills the conduit 34 and condensed water fills the lower region of the housing 32 to the level of conduit 22 thereby providing constant hydrostatic pressure to said other side of the DPU. The conduits 22, 24 and 34 are preferably capillary tubes.

An indicator 38 is connected from the DPU 26 to indicate the difference between the pressures inside the conduits 22 and 24. The DPU 26 and indicator 38 are entirely conventional. If desired, the output of the DPU may be employed for process control as well as indication of the level of liquid in the tank 12.

As stated previously herein, faulty signals may be produced by the DPU if loss of water occurs in the reference column conduit 34.

Figure 3:
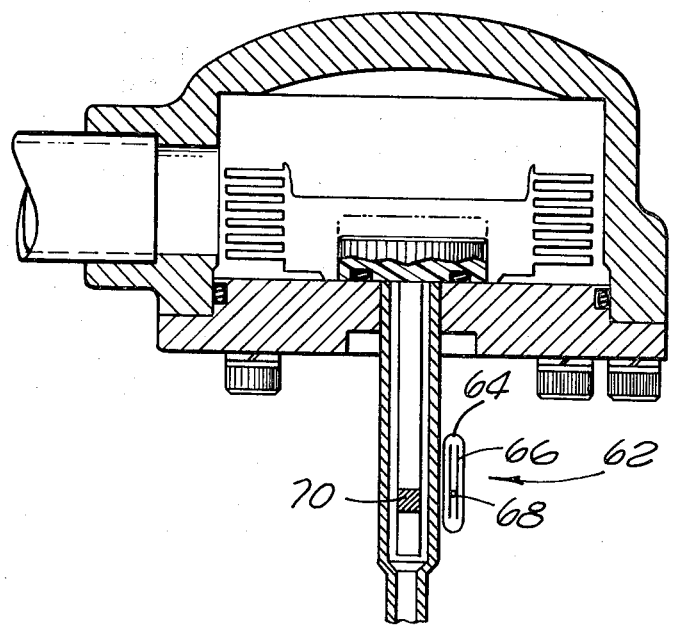
FIG. 3 is a vertical sectional view showing the sensor of FIG. 2 with the float in a lower position resulting from loss of liquid from the reference column conduit of the system.
Figure 2:
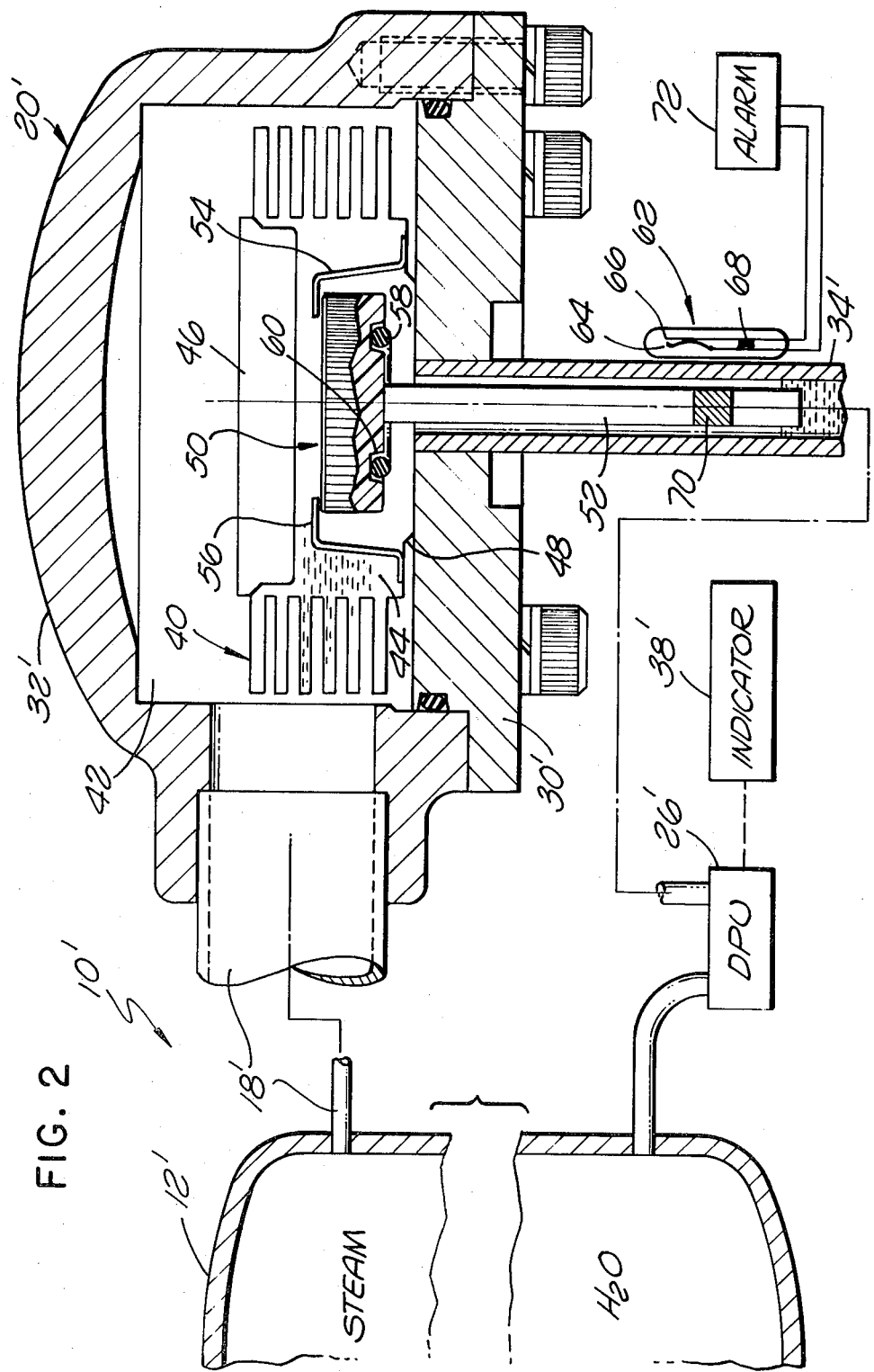
FIG. 2 is a diagrammatic view of a liquid level system embodying the novel alarm device of the present invention employing a float in a sensor which is shown in its upper normal position.

Reference is now made to FIGS. 2 and 3 of the drawings which show a liquid level system embodying the novel alarm device of the present invention which will indicate such a loss of liquid so that corrective measures may be taken. The parts shown in FIGS. 2 and 3 which are the same as or similar to that shown in FIG. 1 bear the same reference numerals primed. Hence, their description will not be repeated. The system 10' of the present invention is essentially identical to that illustrated in FIG. 1 except for the sensor 20'. The top of conduit 34' terminates in the base 30' of the sensor housing. A movable pressure sensitive barrier or diaphragm 40 is provided in the housing 32' of the sensor 20' dividing the housing into separate chambers 42 and 44. Preferably, the barrier is in the form of a bellows having an upper, movable free end 46 and a lower end formed as a lip 48 which is sealed in a liquid tight manner, such as by welding, to the base 30' of the housing. Thus, it will be appreciated that the region inside the housing 32' outside of the bellows is in flow communication with the upper region of the tank 12' by the conduit 18', and the chamber 44 inside the bellows is in flow communication with the interior of the conduit 34' and the DPU 26'. The interior of the bellows and the conduit 34' are filled with water thereby providing the reference column for the system.

A float 50 is mounted in the interior of the bellows 40. The float may be formed of any suitable material which is less dense than the reference column liquid. For example, the float may be a light stainless steel hollow container reinforced with an expanded plastic for withstanding high pressure. An extension rod 52 on the float extends downwardly into the upper portion of the conduit 34'. A cage 54 is fixed to the lip 48 of the bellows. The cage embodies an upper inwardly extending flange 56 which extends over the top of the float 50 to retain the float and protect it from damage due to either expansion or collapse of the bellows. An elastomeric O-ring 58 is mounted in an annular groove 60 in the bottom of the float coaxial with the conduit 34'. Thus, if the conduit is ruptured, causing the loss of water therein so that the float drops to the position illustrated in FIG. 3, the top of the conduit will be sealed off from the interior of the sensor housing. This is significant in the event the bellows 40 ruptures which could result in dangerous tank fluids flowing out of the conduit 34' if it were not for the seal 58.

A switch, generally designated 62, is mounted outside of the conduit 34' adjacent to the extension rod 52 on the float. The movable contact 64 of the switch is held normally out of engagement with the fixed contact 66 by spring 68, as shown in FIG. 3. Preferably, the switch is a reed switch. The switch is actuated by a magnet 70 mounted on the extension rod 52.

With the conduit 34' and bellows filled with water, and therefore the float located in its uppermost position as illustrated at FIG. 2, the magnetic field produced by the magnet 70 adjacent to the switch will cause the contacts thereof to be closed. In this condition, the alarm 72 coupled to the switch will be de-energized. If water escapes from the conduit 34' due to a leak therein, etc., the float 50 will drop to the position illustrated in FIG. 3 thereby lowering the magnet 70 so that its field no longer maintains the contacts of the switch 62 closed. As a consequence, the spring 61 will open the contacts so that the alarm 72 is energized. Energization of the alarm will alert the plant operator that the liquid level measuring system should be examined and corrective measures taken. Thus, the alarm device of the present invention will signal the operator that the DPU may be producing faulty signals.

What is claimed is:

1. A fluid link for a liquid level system comprising: a housing; movable pressure sensitive barrier means dividing said housing into separate first and second chambers; said housing having an inlet for admitting fluid under pressure into said first chamber; differential pressure sensing means; a conduit providing flow communication between said second chamber and said differential pressure sensing means; an incompressible liquid filling said second chamber and said conduit; a float in said second chamber, said float carrying switch actuating means; switch means adapted to be connected to indicating means, said switch means being actuated in response to the position of said switch actuating means on said float; and sealing means on said float for closing off said conduit when said liquid is lost therefrom.

* * * * *

UNITED STATES PATENT OFFICE
CERTIFICATE OF CORRECTION

PATENT NO. : 4,377,809
DATED : March 22, 1983
INVENTOR(S) : Victor N. Lawford

It is certified that error appears in the above-identified patent and that said Letters Patent are hereby corrected as shown below:

On the title page item [73] should read:

---Assignee: International Telephone and
Telegraph Corporation
New York, N.Y. ---

Signed and Sealed this

Twenty-eighth Day of June 1983

[SEAL]

Attest:

GERALD J. MOSSINGHOFF

Attesting Officer     Commissioner of Patents and Trademarks